US012010442B1

(12) United States Patent
Ollila

(10) Patent No.: US 12,010,442 B1
(45) Date of Patent: Jun. 11, 2024

(54) SYSTEMS AND METHODS INCORPORATING ADJUSTABLE FOCUS AND EXTENDED DEPTH-OF-FIELD CORRECTION

(71) Applicant: Varjo Technologies Oy, Helsinki (FI)

(72) Inventor: Mikko Ollila, Tampere (FI)

(73) Assignee: Varjo Technologies Oy, Helsinki (FI)

( * ) Notice: Subject to any disclaimer, the term of this patent is extended or adjusted under 35 U.S.C. 154(b) by 94 days.

(21) Appl. No.: 17/991,384

(22) Filed: Nov. 21, 2022

(51) Int. Cl.
*H04N 23/959* (2023.01)
*G06T 5/00* (2024.01)
(Continued)

(52) U.S. Cl.
CPC ............ *H04N 23/959* (2023.01); *G06T 5/00* (2013.01); *G06T 5/50* (2013.01); *H04N 7/181* (2013.01);
(Continued)

(58) Field of Classification Search
CPC .... H04N 23/959; H04N 7/181; H04N 23/675; G06T 5/00; G06T 5/50; G06T 2207/20221
See application file for complete search history.

(56) References Cited

U.S. PATENT DOCUMENTS

2020/0400957 A1\* 12/2020 Van Heugten ..... G02B 27/0172
2021/0012531 A1\* 1/2021 Ollila ...................... G06T 7/50
(Continued)

OTHER PUBLICATIONS

Abuolaim et al, "Defocus Deblurring Using Dual-Pixel Data", European conference on Computer Vision, Jul. 16, 2020, 27 pages.
(Continued)

*Primary Examiner* — Padma Haliyur
(74) *Attorney, Agent, or Firm* — Ziegler IP Law Group

(57) ABSTRACT

A system including server(s) configured to: receive, from N client devices, information indicating optical depths at which N users are gazing; send, to imaging device including left camera and right camera, information indicating N optical depths; and in each cycle of N consecutive pairs of left images and right images, for M ranging from 1 to N: receive $M^{th}$ left image captured by focusing left camera at $M^{th}$ optical depth; select such image for user(s) gazing within focusing range; generate extended depth-of-field (EDOF)-corrected $M^{th}$ left images; receive $M^{th}$ right image captured by focusing right camera according to another optical depth; select such image for other user(s) gazing within another focusing range; generate EDOF-corrected $M^{th}$ right images; and send $M^{th}$ left image, EDOF-corrected $M^{th}$ left images, $M^{th}$ right image, EDOF-corrected $M^{th}$ right images to client device(s) of user(s), users other than user(s), other user(s), users other than other user(s), respectively.

16 Claims, 6 Drawing Sheets

(51) Int. Cl.
*G06T 5/50* (2006.01)
*H04N 7/18* (2006.01)
*H04N 23/67* (2023.01)

(52) U.S. Cl.
CPC . *H04N 23/675* (2023.01); *G06T 2207/20221* (2013.01)

(56) References Cited

U.S. PATENT DOCUMENTS

2021/0044757 A1* 2/2021 Kuriyama ............ H04N 23/676
2021/0327030 A1* 10/2021 Ollila ........................ G06T 5/70

OTHER PUBLICATIONS

Lee et al, "Iterative Filter Adaptive Network for Single Image Defocus Deblurring", pp. 2034-2042, 2021, 9 pages.
Tan et al, :EDoF-ToF: extended depth of field time-of-flight imaging, Optics Express, vol. 29, No. 23, https://doi.org/10.1364/OE.441515, Nov. 8, 2021, 17 pages.

* cited by examiner

| | | | | | | | | | | | |
|---|---|---|---|---|---|---|---|---|---|---|---|
| USER 1 LEFT EYE | AF | ED OF | ED OF | | ED OF | AF | ED OF | ... | ED OF | ED OF | ED OF |
| USER 1 RIGHT EYE | ED OF | AF | ED OF | | ED OF | ED OF | ED OF | ... | ED OF | AF | ED OF |
| USER 2 LEFT EYE | ED OF | AF | ED OF | | AF | ED OF | ED OF | ... | ED OF | ED OF | ED OF |
| USER 2 RIGHT EYE | ED OF | ED OF | AF | | ED OF | ED OF | AF | ... | AF | ED OF | AF |
| USER 3 LEFT EYE | ED OF | AF | AF | | ED OF | ED OF | AF | ... | AF | ED OF | AF |
| USER 3 RIGHT EYE | AF | ED OF | ED OF | | ED OF | AF | ED OF | ... | ED OF | ED OF | ED OF |

FIG. 2C

| | | | | | | | |
|---|---|---|---|---|---|---|---|
| USER 1 LEFT EYE | AF | ED/OF | ED/OF | ED/OF | ED/OF | ED/OF | ED/OF |
| USER 1 RIGHT EYE | ED/OF | AF | ED/OF | ED/OF | ED/OF | ED/OF | ED/OF |
| USER 2 LEFT EYE | ED/OF | AF | ED/OF | ED/OF | ED/OF | ED/OF | ED/OF |
| USER 2 RIGHT EYE | ED/OF | ED/OF | AF | ED/OF | ED/OF | ED/OF | ED/OF |
| USER 3 LEFT EYE | ED/OF | ED/OF | AF | ED/OF | ED/OF | ED/OF | ED/OF |
| USER 3 RIGHT EYE | ED/OF | ED/OF | ED/OF | AF | ED/OF | ED/OF | ED/OF |
| USER 4 LEFT EYE | ED/OF | ED/OF | ED/OF | AF | ED/OF | ED/OF | ED/OF |
| USER 4 RIGHT EYE | AF | ED/OF | ED/OF | ED/OF | ED/OF | ED/OF | ED/OF |

...

| AF | ED/OF | ED/OF | ED/OF | ED/OF | ED/OF | ED/OF | ED/OF |
| ED/OF | AF | ED/OF | ED/OF | ED/OF | ED/OF | ED/OF | ED/OF |
| ED/OF | AF | ED/OF | ED/OF | ED/OF | ED/OF | ED/OF | ED/OF |
| ED/OF | ED/OF | AF | ED/OF | ED/OF | ED/OF | ED/OF | ED/OF |
| ED/OF | ED/OF | AF | ED/OF | ED/OF | ED/OF | ED/OF | ED/OF |
| ED/OF | ED/OF | ED/OF | AF | ED/OF | ED/OF | ED/OF | ED/OF |
| ED/OF | ED/OF | ED/OF | AF | ED/OF | ED/OF | ED/OF | ED/OF |
| AF | ED/OF | ED/OF | ED/OF | ED/OF | ED/OF | ED/OF | ED/OF |

FIG. 2D

SYSTEMS AND METHODS INCORPORATING ADJUSTABLE FOCUS AND EXTENDED DEPTH-OF-FIELD CORRECTION

TECHNICAL FIELD

The present disclosure relates to systems incorporating adjustable focus and extended depth-of-field (EDOF) correction. The present disclosure also relates to methods incorporating adjustable focus and EDOF correction.

BACKGROUND

In the recent decade, three-dimensional (3D) telepresence is actively being explored by researchers to bring the world closer. Such a 3D telepresence involves using evolving technologies such as immersive extended-reality (XR) technologies which makes an individual feel as if they are present at a location different from an existing location of the individual. With recent advancements in such technologies, demand for generating high-quality and realistic images that can be accessed by multiple users using multiple devices has been increasing.

Simultaneous generation of such images for multiple devices is quite complex, and is associated with several limitations. Firstly, for remote telepresence, cameras that are used for image capturing typically suffer from depth-of-field issues. Such depth-of-field issues are prominent in fixed-focus cameras due to lack of adjustable optical focus. Images of a real-world environment are sharply captured by a given fixed-focus camera only for a specific focal plane, and are captured blurred outside the specific focal plane. Furthermore, even when an autofocus camera is employed for capturing the images, it is still not possible to capture sharp (i.e., in-focus) images in an entire field of view, because the autofocus camera can be adjusted according to only one focussing distance range at a time. Moreover, there is also a limitation of the autofocus camera in providing a greater resolution because its focal length cannot be increased as that would result in a limited depth of field. Therefore, the generated images are of low quality and unrealistic. Secondly, existing techniques for generating images using a stereo pair of cameras are suitable only for a single user, and thus multiple users gazing at different optical depths cannot be served by such existing techniques.

Therefore, in light of the foregoing discussion, there exists a need to overcome the aforementioned drawbacks associated with existing equipment and techniques for image generation for multiple devices.

SUMMARY

The present disclosure seeks to provide a system incorporating adjustable focus and extended depth-of-field (EDOF) correction. The present disclosure also seeks to provide a method incorporating adjustable focus and EDOF correction. An aim of the present disclosure is to provide a solution that overcomes at least partially the problems encountered in prior art.

In a first aspect, an embodiment of the present disclosure provides a system comprising at least one server communicably coupled to client devices of N users and an imaging device, wherein the imaging device comprises a left camera and a right camera, each of the left camera and the right camera having an adjustable optical focus, wherein the at least one server is configured to:

receive, from the client devices of the N users, information indicative of respective optical depths at which the N users are gazing;

send, to the imaging device, information indicative of N optical depths; and in each cycle of N consecutive pairs of left images and right images, for M ranging from 1 to N:

receive, from the imaging device, an $M^{th}$ left image captured by adjusting the optical focus of the left camera according to an $M^{th}$ optical depth from amongst the N optical depths;

select the $M^{th}$ left image for at least one user who is gazing at an optical depth that lies in a focusing distance range covered by adjusting the optical focus of the left camera according to the $M^{th}$ optical depth;

apply respective extended depth-of-field (EDOF) corrections to the $M^{th}$ left image, based on respective optical depths at which one or more users other than the at least one user are gazing, to generate respective EDOF-corrected $M^{th}$ left images;

receive, from the imaging device, an $M^{th}$ right image captured by adjusting the optical focus of the right camera according to another optical depth from amongst the N optical depths, wherein each of N consecutive right images in said cycle corresponds to a different optical depth from amongst the N optical depths;

select the $M^{th}$ right image for at least one other user who is gazing at an optical depth that lies in another focusing distance range covered by adjusting the optical focus of the right camera according to the another optical depth;

apply respective EDOF corrections to the $M^{th}$ right image, based on respective optical depths at which one or more users other than the at least one other user are gazing, to generate respective EDOF-corrected $M^{th}$ right images; and send the $M^{th}$ left image to a client device of the at least one user, the EDOF-corrected $M^{th}$ left images to respective ones of client devices of the one or more users other than the at least one user, the $M^{th}$ right image to a client device of the at least one other user, and the EDOF-corrected $M^{th}$ right images to respective ones of client devices of the one or more users other than the at least one other user.

In a second aspect, an embodiment of the present disclosure provides a method comprising:

receiving, from client devices of N users, information indicative of respective optical depths at which the N users are gazing;

sending, to an imaging device, information indicative of N optical depths, wherein the imaging device comprises a left camera and a right camera, each of the left camera and the right camera having an adjustable optical focus; and in each cycle of N consecutive pairs of left images and right images, for M ranging from 1 to N:

receiving, from the imaging device, an $M^{th}$ left image captured by adjusting the optical focus of the left camera according to an $M^{th}$ optical depth from amongst the N optical depths;

selecting the $M^{th}$ left image for at least one user who is gazing at an optical depth that lies in a focusing distance range covered by adjusting the optical focus of the left camera according to the $M^{th}$ optical depth;

applying respective extended depth-of-field (EDOF) corrections to the $M^{th}$ left image, based on respective optical depths at which one or more users other than the at least one user are gazing, for generating respective EDOF-corrected $M^{th}$ left images;

receiving, from the imaging device, an $M^{th}$ right image captured by adjusting the optical focus of the right camera according to another optical depth from amongst the N optical depths, wherein each of N consecutive right images in said cycle corresponds to a different optical depth from amongst the N optical depths;

selecting the $M^{th}$ right image for at least one other user who is gazing at an optical depth that lies in another focusing distance range covered by adjusting the optical focus of the right camera according to the another optical depth;

applying respective EDOF corrections to the $M^{th}$ right image, based on respective optical depths at which one or more users other than the at least one other user are gazing, for generating respective EDOF-corrected $M^{th}$ right images; and sending the $M^{th}$ left image to a client device of the at least one user, the EDOF-corrected $M^{th}$ left images to respective ones of client devices of the one or more users other than the at least one user, the $M^{th}$ right image to a client device of the at least one other user, and the EDOF-corrected $M^{th}$ right images to respective ones of client devices of the one or more users other than the at least one other user.

Embodiments of the present disclosure substantially eliminate or at least partially address the aforementioned problems in the prior art, and enable generation of high-quality, highly immersive and realistic images using a single pair of cameras, by way of using optical focus adjustment and extended depth-of-field corrections, and allow for multiple users gazing at different optical depths to view such images simultaneously.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein:

FIGS. 2A, 2B, 2C, and 2D illustrate different exemplary ways in which consecutive pairs of left images and right images are displayed at client devices of different users, in accordance with an embodiment of the present disclosure.

Figure 1A:
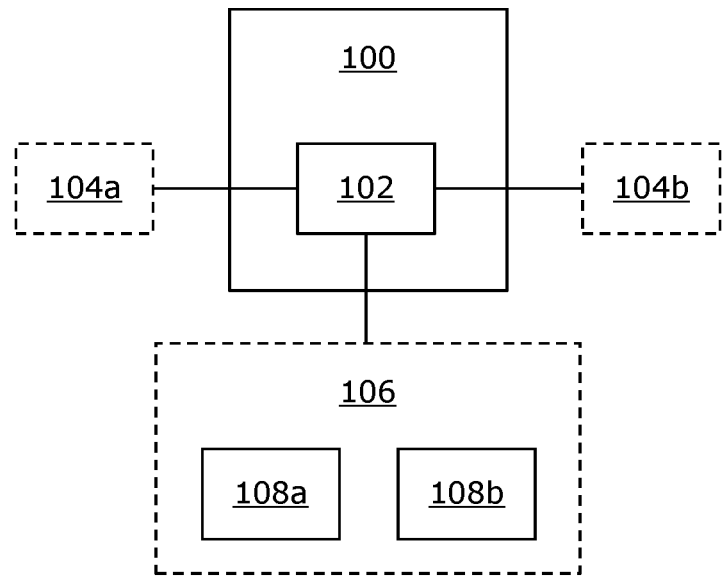
FIGS. 1A and 1B illustrate block diagrams of architectures of a system incorporating adjustable focus and extended depth-of-field correction, in accordance with different embodiments of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides a system comprising at least one server communicably coupled to client devices of N users and an imaging device, wherein the imaging device comprises a left camera and a right camera, each of the left camera and the right camera having an adjustable optical focus, wherein the at least one server is configured to:

receive, from the client devices of the N users, information indicative of respective optical depths at which the N users are gazing;

send, to the imaging device, information indicative of N optical depths; and in each cycle of N consecutive pairs of left images and right images, for M ranging from 1 to N:

receive, from the imaging device, an $M^{th}$ left image captured by adjusting the optical focus of the left camera according to an $M^{th}$ optical depth from amongst the N optical depths;

select the $M^{th}$ left image for at least one user who is gazing at an optical depth that lies in a focusing distance range covered by adjusting the optical focus of the left camera according to the $M^{th}$ optical depth;

apply respective extended depth-of-field (EDOF) corrections to the $M^{th}$ left image, based on respective optical depths at which one or more users other than the at least one user are gazing, to generate respective EDOF-corrected $M^{th}$ left images;

receive, from the imaging device, an $M^{th}$ right image captured by adjusting the optical focus of the right camera according to another optical depth from amongst the N optical depths, wherein each of N consecutive right images in said cycle corresponds to a different optical depth from amongst the N optical depths;

select the $M^{th}$ right image for at least one other user who is gazing at an optical depth that lies in another focusing distance range covered by adjusting the optical focus of the right camera according to the another optical depth;

apply respective EDOF corrections to the $M^{th}$ right image, based on respective optical depths at which one or more users other than the at least one other user are gazing, to generate respective EDOF-corrected $M^{th}$ right images; and send the $M^{th}$ left image to a client device of the at least one user, the EDOF-corrected $M^{th}$ left images to respective ones of client devices of the one or more users other than the at least one user, the $M^{th}$ right image to a client device of the at least one other user, and the EDOF-corrected $M^{th}$ right images to respective ones of client devices of the one or more users other than the at least one other user.

In a second aspect, an embodiment of the present disclosure provides a method comprising:

receiving, from client devices of N users, information indicative of respective optical depths at which the N users are gazing;

sending, to an imaging device, information indicative of N optical depths, wherein the imaging device comprises a left camera and a right camera, each of the left camera and the right camera having an adjustable optical focus; and in each cycle of N consecutive pairs of left images and right images, for M ranging from 1 to N:

receiving, from the imaging device, an $M^{th}$ left image captured by adjusting the optical focus of the left camera according to an $M^{th}$ optical depth from amongst the N optical depths;

selecting the $M^{th}$ left image for at least one user who is gazing at an optical depth that lies in a focusing distance range covered by adjusting the optical focus of the left camera according to the $M^{th}$ optical depth;

applying respective extended depth-of-field (EDOF) corrections to the $M^{th}$ left image, based on respective optical depths at which one or more users other than the at least one user are gazing, for generating respective EDOF-corrected $M^{th}$ left images;

receiving, from the imaging device, an $M^{th}$ right image captured by adjusting the optical focus of the right camera according to another optical depth from amongst the N optical depths, wherein each of N consecutive right images in said cycle corresponds to a different optical depth from amongst the N optical depths;

selecting the $M^{th}$ right image for at least one other user who is gazing at an optical depth that lies in another focusing distance range covered by adjusting the optical focus of the right camera according to the another optical depth;

applying respective EDOF corrections to the $M^{th}$ right image, based on respective optical depths at which one or more users other than the at least one other user are gazing, for generating respective EDOF-corrected $M^{th}$ right images; and sending the $M^{th}$ left image to a client device of the at least one user, the EDOF-corrected $M^{th}$ left images to respective ones of client devices of the one or more users other than the at least one user, the $M^{th}$ right image to a client device of the at least one other user, and the EDOF-corrected $M^{th}$ right images to respective ones of client devices of the one or more users other than the at least one other user.

The present disclosure provides the aforementioned system and the aforementioned method that enable generation of high-quality, highly immersive and realistic images using a single pair of cameras, by way of using optical focus adjustment and extended depth-of-field corrections, and allow for multiple users gazing at different optical depths to view such images simultaneously. For each user, out of the N consecutive pairs of left images and right images, at least one of the left images and at least one of the right images are captured by adjusting the optical focus of the respective cameras in a manner that an optical depth at which said user is gazing lies in the respective focussing distance ranges. In addition, EDOF corrections are applied to remaining left images and remaining right images of the N consecutive pairs, based on corresponding optical depths at which said user is gazing. As a result, a high visual quality is achieved for each user by a combined view of a given pair of a left image and a right image (whether generated by optical focus adjustment or EDOF correction). Notably, human binocular vision fuses the left image and the right image into one, such that human brain picks up a better contrasted image from amongst the left image and the right image. In other words, even when a given user is not shown a stereo image pair comprising images captured by adjusting the optical focus according to an optical depth at which she/he is gazing, the given user would still experience acceptably high realism and immersiveness when a given pair comprising an optical-focus-adjusted image and an EDOF-corrected image or a given pair comprising two EDOF-corrected images is shown to the given user, because of human binocular vision. The system and the method are simple, robust, fast, reliable, support real-time high-quality image generation and can be implemented with ease.

Notably, the at least one server controls an overall operation of the system. In some implementations, the at least one server is implemented as a remote server. In such implementations, the remote server is separately located from the imaging device and the client devices. In an example, the remote server could be a cloud server that provides a cloud computing service. In other implementations, the at least one server is implemented as at least one processor of a computing device. Examples of the computing device include, but are not limited to, a laptop, a desktop, a tablet, a phablet, a personal digital assistant, a workstation, and a console.

It will be appreciated that the term "at least one server" refers to "a single server" in some implementations, and to "a plurality of servers" in other implementations. When the system comprises the single server, all operations of the system could be performed by the single server. When the system comprises the plurality of servers, different operations of the system could be performed by different (and specially configured) servers from amongst the plurality of servers.

Notably, a given client device is associated with a given user. The given client device, in operation, sends information indicative of an optical depth at which the given user is gazing to the at least one server, and subsequently receives a pair of a left image and a right image from the at least one server. At least twice in the N consecutive pairs, one of the left image and the right image is an optical-focus-adjusted image, while a remaining of the left image and the right image is an EDOF-corrected image. At other times, both the left image and the right image are EDOF-corrected images. These images are to be presented to the given user of the given client device. It will be appreciated that different client devices (associated with different users) could be physically present in different real-world environments. For example, the different client devices could be present in different geographical regions (for example, different countries or jurisdictions).

Optionally, the given client device is implemented as a display apparatus. The "display apparatus" refers to a specialized equipment that is configured to present an extended-reality (XR) environment to a user when the display apparatus, in operation, is worn by the given user on his/her head. In such an instance, the display apparatus acts as a specialized device (for example, such as an XR headset, a pair of XR glasses, and the like) that is operable to present a visual scene of the XR environment to the given user. Commonly, the "display apparatus" is referred to as "head-mounted display (HMD) device". The term "extended-reality" encompasses virtual reality (VR), augmented reality (AR), mixed reality (MR), and the like.

Throughout the present disclosure, the term "imaging device" refers to a specialized device that is capable of facilitating virtual teleportation. It will be appreciated that the imaging device may be present in a real-world environment that is different from other real-world environments in which the different users are present. Furthermore, the term "camera" refers to an equipment that is operable to detect and process light signals received from a real-world environment, so as to capture images of the real-world environment. It will be appreciated that the left camera and the right camera of the imaging device are employed to capture images of the real-world environment from a perspective of a left eye and a right eye, respectively. Optionally, in this regard, the left camera and the right camera are arranged to face said real-world environment in a manner that a distance between them is equal to an interpupillary distance (IPD) between the left eye and the right eye. In an example, the distance between the left camera and the right camera may be equal to an average IPD.

Optionally, a given camera is implemented as a visible-light camera. Examples of the visible-light camera include, but are not limited to, a Red-Green-Blue (RGB) camera, a Red-Green-Blue-Alpha (RGB-A) camera, a Red-Green-Blue-Depth (RGB-D) camera, an event camera, a Red-Green-Blue-White (RGBW) camera, a Red-Yellow-Yellow-Blue (RYYB) camera, a Red-Green-Green-Blue (RGGB) camera, a Red-Clear-Clear-Blue (RCCB) camera, a Red-Green-Blue-Infrared (RGB-IR) camera, and a monochrome camera. It will be appreciated that an image sensor of the given camera comprises a Bayer colour filter array (CFA) arranged in front of a plurality of pixels of the image sensor. Such a Bayer CFA could be one of: a 4C Bayer CFA (also referred to as "quad" or "tetra", wherein a group of 2×2 pixels has a same colour), a 9C Bayer CFA (also referred to as "nona", wherein a group of 3×3 pixels has a same colour), a 16C Bayer CFA (also referred to as "hexadeca", wherein a group of 4×4 pixels has a same colour). Alternatively, optionally, the given camera is implemented as a combination of a visible-light camera and a depth camera. Examples of the depth camera include, but are not limited to, a Red-Green-Blue-Depth (RGB-D) camera, a ranging camera, a Light Detection and Ranging (LiDAR) camera, a Time-of-Flight (ToF) camera, a Sound Navigation and Ranging (SONAR) camera, a laser rangefinder, a stereo camera, a plenoptic camera, an infrared (IR) camera. As an example, the given camera may be implemented as the stereo camera. The given camera may have a sensor chip having some phase detection autofocus (PDAF) pixels. The term "given camera" encompasses the left camera, or the right camera, or both the left camera and the right camera.

Notably, the given camera has an adjustable optical focus. This means that the given camera is focusable i.e., a focal plane of at least one optical element (for example, such as a camera lens) of the given camera is adjustable. Such an adjustment facilitates in capturing sharp images of objects present in the real-world environment in which the given camera is present. The given camera having the adjustable optical focus allows for using a longer focal length, and thus achieving a higher resolution of captured image. Moreover, it can be employed to capture a wide depth-of-field by adjusting the optical focus according to different optical depths.

Optionally, a processor of the given client device is configured to determine the given optical depth at which the given user is gazing, based on a convergence of gaze directions of the given user's eyes. In this regard, the given optical depth can be determined, based on an IPD of the given user, by using a triangulation technique. Herein, the term "gaze direction" refers to a direction in which a given eye of the given user is gazing. The gaze direction may be represented by a gaze vector. It will be appreciated that when the given user's gaze is directed (namely, focused) towards a point or a region within the real-world environment, a gaze direction of a left eye and a gaze direction of a right eye of the given user are different from each other, and both the aforesaid gaze directions will converge at said point or said region.

Additionally or alternatively, optionally, the processor of the given client device is configured to determine the given optical depth at which the given user is gazing, based on a depth map of a given real-world scene of the given real-world environment and a given gaze direction of a given eye of the given user.

Optionally, N is one of: 2, 3 or 4. In this regard, the imaging device could be employed to simultaneously serve (i.e., could be utilised for simultaneously generating pairs of left images and right images for) 2 users, 3 users or 4 users. However, the imaging device could also be employed to simultaneously serve more than 4 users. Thus, N could also be greater than 4. In an example, a number of users that are to be served by the imaging device could be 6 (i.e., when N is equal to 6). The number of users could be further increased if a frame rate of the given camera is increased. It will be appreciated that when N is equal to any one of the aforesaid values, the system allows for multiple users gazing at different optical depths to view high-quality, highly immersive and realistic images in a simultaneous manner.

According to an embodiment, the N optical depths comprise fixed optical depths. In this regard, the at least one server sends information indicative of the fixed optical depths to the imaging device only once, wherein the imaging device utilises this information for capturing multiple cycles of the N consecutive pairs of left images and right images. In such a case, the at least one server would not need to wait for receiving (from the client devices of the N users) the information indicative of the respective optical depths at which the N users are gazing, and then send said information to the imaging device for capturing the aforesaid images. Advantageously, image capturing operations of the left camera and the right camera are performed in real-time or near-real time (without any latency/delay).

It will be appreciated that the fixed optical depths are selected by the at least one server in a manner that the fixed optical depths would cover a wide range of focussing distances of a given camera. Beneficially, this facilitates in capturing high-quality images for each user. This is because the at least one server would select a given image only for that user who is gazing at an optical depth that lies in a focusing distance range covered by adjusting the optical focus of the left camera according to a fixed optical depth.

In an example, for a cycle of four consecutive pairs of left images and right images (that is, N=4), four fixed optical depths are employed for the given camera. The four fixed optical depths could be, for example, as follows:

65 cm (for covering a focussing distance range of 54 cm to 82 cm), 85 cm (for covering a focussing distance range of 67 cm to 117 cm), 1.5 m (for covering a focussing distance range of 1.0 m to 2.9 m), and 2.5 m (for covering a focussing distance range of 1.4 m to 13.1 m).

The aforesaid four fixed optical depths have been calculated, for example, for a case when a pixel size is 1.4 micrometres, a focal length of the given camera is 4.9 millimetres, and an aperture of the given camera is f/2.8.

In another example, for a cycle of three consecutive pairs of left images and right images (that is, N=3), three fixed optical depths are employed for the given camera. The three fixed optical depths could be, for example as follows:

70 cm (covering a focussing distance range of 57 cm to 91 cm), 1 m (covering a focussing distance range of 75 cm to 1.48 m), and 2.8 m (covering a focussing distance range of 1.47 m to infinity).

It will also be appreciated that the fixed optical depths could be changed (namely, modified), for example, when the at least one server determines that the N users are gazing only at nearby objects and/or at objects lying at intermediate distances from the eyes of the N users for a time period greater than a predefined threshold. In other words, when the at least one server determines that the N users are not at all gazing at faraway objects, the at least one server could modify at least one of the fixed optical depths accordingly. The fixed optical depths may also be changed, for example, when the number of users increases or decreases.

Pursuant to the present disclosure, when capturing a given pair of a left image and right image using the left camera and the right camera, respectively, a fixed optical depth employed for adjusting the optical focus of the left camera is different from a fixed optical depth employed for adjusting the optical focus of the right camera. Moreover, for a cycle of N consecutive pairs of left images and right images, a sequence in which the N fixed optical depths are employed for a given camera could be selected randomly. The same sequence may be employed for subsequent cycles of N consecutive pairs of left images and right images.

Alternatively, different sequences may be employed for different cycles of N consecutive pairs of left images and right images. In an example, for a cycle of four consecutive pairs of left images and right images, a sequence of employing four fixed optical depths for the left camera may be: 65 cm, 85 cm, 1.5 m, 2.5 m, whereas a sequence of employing four fixed optical depths for the right camera may be: 1.5 m, 2.5 m, 65 cm, 85 cm. Thus, no two right images (in the N consecutive right images) correspond to a same optical depth.

Additionally, optionally, the at least one server is configured to select an optical depth based on two different optical depths at which at least two users from amongst the N users are gazing, when the two different optical depths correspond to a same focussing distance range that is covered by adjusting the optical focus of a given camera according to the selected optical depth, wherein the N optical depths comprise the selected optical depth. In this regard, when the two different optical depths at which the at least two users are gazing belong to the same focussing distance range, a fixed optical depth that covers the same focussing distance range is selected by the at least one server. Therefore, at least one of the N optical depths could be selected based on two different optical depths at which at least two users are gazing, while a remainder of the N optical depths could be fixed optical depths (as described earlier). In an example, optical depths at which two users are gazing may be 55 cm and 70 cm, respectively, which belong to a same focussing distance range of 54 cm to 82 cm. In such a case, an optical depth of 65 cm covering the same focussing distance range could be selected by the at least one server as one of the N optical depths. It will be appreciated that since the at least one of the N optical depths is selected based on the two different optical depths corresponding to the same focussing distance range, the remainder of the N optical depths could be selected as fixed optical depths that would cover a wide and an overall better range of focussing distances of the given camera.

When the optical focus of a given camera is adjusted at a given optical depth (from amongst the N optical depths) for capturing a given image, objects or their parts lying at a focussing distance range (covered by adjusting the optical focus at the given optical depth) are captured sharply in the given image. Referring to and continuing with the previous example, the at least one server receives a first left image (in a given cycle of N consecutive pairs) that is captured by adjusting the optical focus of the left camera according to a fixed optical depth of 65 cm (from amongst the four fixed optical depths), and a first right image (in the given cycle of N consecutive pairs) that is captured by adjusting the optical focus of the right camera according to another fixed optical depth of 1.5 m (from amongst the four fixed optical depths). In this regard, the first left image is selected for at least one user who is gazing at an optical depth that lies in the focussing distance range of 54 cm to 82 cm (that is covered by adjusting the optical focus of the left camera according to the optical depth of 65 cm), while the first right image is selected for at least one other user who is gazing at another optical depth that lies in the focussing distance range of 1.0 m to 2.9 m (that is covered by adjusting the optical focus of the right camera according to the optical depth of 1.5 m). For example, if optical depths at which four users A1, A2, A3, and A4 are gazing is 90 cm, 60 cm, 3.2 m, and 1.7 m, respectively, the first left image and the first right image are sent to client devices of users A2 and A4, respectively, in real time or near-real time (without any latency/delay).

For one or more users other than the at least one user, respective EDOF-corrected first left images are generated by applying respective EDOF corrections to the first left image, based on the respective optical depths at which the one or more users are gazing, and sent to respective client devices of the one or more users. Likewise, for one or more users other than the at least one other user, respective EDOF-corrected first right images are generated by applying respective EDOF corrections to the first right image, based on the respective optical depths at which said one or more users are gazing, and sent to respective client devices of said one or more users. Referring to and continuing with the previous example, for the users A1, A3 and A4, EDOF-corrected first left images are generated (by applying respective EDOF corrections to the first left image) and sent to their respective client devices. Likewise, for the users A1, A2 and A3, EDOF-corrected first right images are generated (by applying respective EDOF corrections to the first right image) and sent to their respective client devices.

Throughout the present disclosure, the term "extended depth-of-field correction" refers to a corrective image processing operation that emulates a visual effect of an extension of a depth-of-field over which the objects or their parts in the real-world environment appear to be in-focus (i.e., well focussed and sharp) in a given image. Herein, the term "depth-of-field" refers to a distance between a nearest point and a farthest point in the real-world environment that are acceptably sharply focused in the given image captured by the given camera. The nearest point lies in front of a focus point (for example, such as an object) on which a lens of the given camera is actually focussed, while the farthest point lies behind the focus point. The nearest point and the farthest point may be at an equal distance or at an unequal distance from the focus point. The depth-of-field (DOF) may be determined based on at least one of: a focal length of the lens of the given camera, a distance between the object and the given camera, a pixel size, an aperture size, an aperture shape, transmission characteristics of an aperture, a number of apertures (in case of a multi-aperture camera). The extension of the depth-of-field does not sacrifice resolution or brightness, thereby clearly capturing the objects or their parts in the real-world environment without a need to adjust the focus of the given camera and an angle between the objects and the given camera. The EDOF correction enables deblurring of objects or their parts that lie outside of a focal region of the lens of the given camera (i.e., outside the DOF of the lens of the given camera) to produce an extended-in-focus view of the real-world environment. The EDOF correction may be applied to capture in-focus images of at least one of: multiple objects present in at least a foreground and/or a background of a given object in the real-world environment, oblique objects, objects at different heights, objects at different optical depths.

Optionally, the respective EDOF corrections are applied by utilising at least one of: defocus map estimation, blind image deblurring deconvolution, non-blind image deblurring deconvolution. These techniques are well-known in the art. The respective EDOF corrections may be performed by employing deblurring neural networks implemented using deep learning techniques, to correct (i.e., deblur) the given image, outside a focal region of a lens of the given camera. Such deblurring neural networks using deep learning techniques are described, for example, in "*EDoF-ToF: extended depth of field time-of-flight imaging*" by Jasper Tan, Vivek Boominathan et al., published in Optics Express, Vol. 29, Issue 23, pp. 38540-38556, November 2021, in "*Defocus deblurring using dual-pixel data*" by Abdullah Abuolaim et al., published in European Conference on Computer Vision, 2020, and in "*Iterative filter adaptive network for single image defocus deblurring*" by Junyong Lee et al., published in IEEE Conference on Computer Vision and Pattern Recognition, pp. 2034-2042, 2021, which have been incorporated herein by reference. It will be appreciated that the respective EDOF corrections could be applied using different neural networks that are selected based on the respective optical depths at which the users are gazing. The different neural networks are customised corresponding to different shorter focussing distance ranges covering an entire wide range of focussing distances, for example, from 10 cm to infinity. For example, a first neural network may be for a focusing distance range of 10 cm to 80 cm, while a second neural network may be for a focusing distance range of 80 cm to infinity, thereby covering an entire focusing distance range.

The different neural networks are easier to implement, and are cost-feasible. Optionally, the respective EDOF corrections are applied by employing a Wiener filter based on a predetermined point spread function (PSF) of a given camera. It will be appreciated that the PSF could be determined by correlating pixels of images that are captured consecutively by the given camera, wherein an optical focus of the given camera is switched between different focussing distances whilst capturing the aforesaid consecutive images. Techniques for determining a correlation between pixels of different images are well-known in the art. One example of such a technique has been described hereinbelow. A person skilled in the art will recognize many variations, alternatives, and modifications of techniques for determining the PSF.

It will be appreciated that the determination of the PSF can be represented mathematically as follows:

In the Fourier domain:

$$\text{blurred\_image\_FT} = \text{ideal\_image\_FT} * \text{PSF\_FT} \text{(Multiplication)}$$

wherein, * (single asterisk) represents multiplication.

In other words, a Fourier transform of the blurred image is equal to a multiplication of a Fourier transform of the ideal image and a Fourier transform of the PSF.

Therefore, $\text{PSF\_FT} = \text{blurred\_image\_FT} / \text{ideal\_image\_FT}$ $$\text{PSF} = \text{inverseFT}(\text{blurred\_image\_FT} / \text{ideal\_image\_FT})$$

Thus, the PSF for the given camera can be determined by applying an inverse Fourier transform to a division of the Fourier transform of the blurred image and the Fourier transform of the ideal image. Hereinabove, the term "ideal image" refers to an in-focus image captured by the given camera, while the term "blurred image" refers to an out-of-focus image captured by the given camera.

In an example, four consecutive images I1, I2, I3, and I4 may be captured by adjusting the optical focus of the given camera according to four fixed optical depths D1, D2, D3, and D4, which correspond to four focussing distance ranges R1, R2, R3, and R4, respectively. Herein, by correlating pixels of the image I1 and respective pixels of the image I2 and assuming the image I1 to be in focus and the image I2 to be out-of-focus, the PSF for the focussing distance range R1 (including the optical depth D1) can be determined. By correlating pixels of the image I2 and respective pixels of the image I3 and assuming the image I2 to be in focus and the image I3 to be out-of-focus, the PSF for the focussing distance range R2 (including the optical depth D2) can be determined. Likewise, the PSF for the focussing distance ranges R3 and R4 (including the optical depths D3 and D4, respectively) can also be determined. Consider an example of the image I3, where objects present within the focussing distance range R3 (namely, at the optical depth D3 and its associated depth of field) would be captured sharply (namely, well-focussed). Thus, EDOF correction(s) can be applied to the image I3, using at least one of: the PSF for the focussing distance range R1 (corresponding to the optical depth D1), the PSF for the focussing distance range R2 (corresponding to the optical depth D2), the PSF for the focussing distance range R4 (corresponding to the optical depth D4). As explained earlier, the respective EDOF corrections can be applied for the N users, based on respective optical depths at which the N users are gazing. Alternatively, the EDOF corrections could be performed by employing deconvolution utilizing a predetermined blur kernel.

It will be appreciated that for a case of two users (that is, N=2), in each cycle of two consecutive pairs of left images and right images, a stereopsis duty cycle (i.e., a duty cycle for both eyes of both the two users) is 100 percent, and a duty cycle for a single eye of a given user is 50 percent. Likewise, for a case of three users (that is, N=3), in each cycle of three consecutive pairs of left images and right images, a stereopsis duty cycle for the three users is 66.66 percent, and a duty cycle for a single eye of a given user is 33.33 percent. Likewise, for a case of four users (that is, N=4), in each cycle of four consecutive pairs of left images and right images, a stereopsis duty cycle for the four users is 50 percent, and a duty cycle for a single eye of a given user is 25 percent.

According to an alternative embodiment, the N optical depths comprise the optical depths at which the N users are gazing, and wherein the $M^{th}$ optical depth is an optical depth at which an $M^{th}$ user is gazing, the at least one user being the $M^{th}$ user, further wherein the another optical depth is an optical depth at which another user other than the $M^{th}$ user is gazing. In this regard, in each cycle of the N consecutive pairs of the left images and the right images, for M ranging from 1 to N, the at least one server is configured to:
  receive, from the imaging device, an $M^{th}$ left image captured by adjusting the optical focus of the left camera according to an optical depth at which an $M^{th}$ user is gazing;
  apply respective EDOF corrections to the $M^{th}$ left image, based on respective optical depths at which one or more users other than the $M^{th}$ user are gazing, to generate respective EDOF-corrected $M^{th}$ left images;
  receive, from the imaging device, an $M^{th}$ right image captured by adjusting the optical focus of the right camera according to an optical depth at which another user other than the $M^{th}$ user is gazing, wherein each of N consecutive right images in said cycle corresponds to an optical depth at which a different user from amongst the N users is gazing;
  apply respective EDOF corrections to the $M^{th}$ right image, based on respective optical depths at which one or more users other than the another user are gazing, to generate respective EDOF-corrected $M^{th}$ right images; and
  send the $M^{th}$ left image to a client device of the $M^{th}$ user, the EDOF-corrected $M^{th}$ left images to respective ones of client devices of the one or more users other than the $M^{th}$ user, the $M^{th}$ right image to a client device of the another user, and the EDOF-corrected $M^{th}$ right images to respective ones of client devices of the one or more users other than the another user.

In an example, in a case of 3 users (that is, N=3), for a first pair of a first left image and a first right image of each cycle of 3 consecutive pairs of left images and right images, the at least one server is configured to:
  receive, from the imaging device, the first left image captured by adjusting the optical focus of the left camera according to an optical depth at which a first user is gazing;
  apply respective EDOF corrections to the first left image, based on respective optical depths at which users other than the first user are gazing, to generate respective EDOF-corrected first left images;
  receive, from the imaging device, the first right image captured by adjusting the optical focus of the right camera according to an optical depth at which a user other than the first user is gazing, wherein the user other than the first user is one of: a second user, a third user;
  apply respective EDOF corrections to the first right image, based on respective optical depths at which users other than said user are gazing, to generate respective EDOF-corrected first right images; and
  send the first left image to a client device of the first user, the respective EDOF-corrected first left images to respective ones of client devices of the users other than the first user, the first right image to a client device of said user other than the first user, and the respective EDOF-corrected first right images to respective ones of client devices of the users other than said user.

Likewise, for a second pair of a second left image and a second right image of said cycle of 3 consecutive pairs of left images and right images, the at least one server is configured to:
  receive, from the imaging device, the second left image captured by adjusting the optical focus of the left camera according to an optical depth at which the second user is gazing;
  apply respective EDOF corrections to the second left image, based on respective optical depths at which users other than the second user are gazing, to generate respective EDOF-corrected second left images;
  receive, from the imaging device, the second right image captured by adjusting the optical focus of the right camera according to an optical depth at which a user other than the second user is gazing, wherein the user other than the second user is one of: the first user, the third user;
  apply respective EDOF corrections to the second right image, based on respective optical depths at which users other than said user are gazing, to generate respective EDOF-corrected second right images; and
  send the second left image to a client device of the second user, the respective EDOF-corrected second left images to respective ones of client devices of the users other than the second user, the second right image to a client device of the user other than the second user, and the respective EDOF-corrected second right images to respective ones of client devices of the users other than said user.

Likewise, for a third pair of a third left image and a third right image of said cycle of 3 consecutive pairs of left images and right images, the at least one server is configured to:
  receive, from the imaging device, the third left image captured by adjusting the optical focus of the left camera according to an optical depth at which the third user is gazing;
  apply respective EDOF corrections to the third left image, based on respective optical depths at which users other than the third user are gazing, to generate respective EDOF-corrected third left images;
  receive, from the imaging device, the third right image captured by adjusting the optical focus of the right camera according to an optical depth at which a user other than the third user is gazing, wherein the user other than the third user is one of: the first user, the second user;
  apply respective EDOF corrections to the third right image, based on respective optical depths at which users other than said user are gazing, to generate respective EDOF-corrected third right images; and
  send the third left image to a client device of the third user, the respective EDOF-corrected third left images to respective ones of client devices of the users other than the third user, the third right image to a client device of the user other than the third user, and the respective EDOF-corrected third right images to respective ones of client devices of the users other than said user.

It will be appreciated that each of the first right image, the second right image, and the third right image corresponds to an optical depth at which a different one of the three users is gazing. In an example, the first right image, the second right image, and the third right image may correspond to respective optical depths at which the second user, the third user, and the first user are gazing, respectively. In another example, the first right image, the second right image and the third right image may correspond to respective optical depths at which the third user, the first user, and the second user are gazing, respectively.

Moreover, optionally, the system further comprises a given client device of a given user from amongst the N users, wherein a processor of the given client device is configured to:
- receive consecutive images for a given eye of the given user in batches, wherein a given batch of consecutive images comprises at least two EDOF-corrected images and, optionally, an image selected for the given user or captured by adjusting the optical focus of a given camera according to an optical depth at which the given user is gazing;
- detect, prior to displaying a given EDOF-corrected image, whether an image selected for the given user or captured by adjusting the optical focus of the given camera according to the optical depth at which the given user is gazing is available in a recently-received batch of consecutive images; and
- when it is detected that said image is available in the recently-received batch of consecutive images, use any one of:
  said image,
  a fusion of said image and the given EDOF-corrected image,
  a fusion of said image and at least two EDOF-corrected images available in the recently-received batch,
for display at the given client device, instead of the given EDOF-corrected image.

It will be appreciated that the image selected for the given user is an optical-focus-adjusted image that is captured by adjusting an optical focus of a given camera according to a fixed optical depth, wherein the optical depth at which the given user is gazing lies in the focussing distance range covered by such an adjustment of the optical focus of the given camera. Selection of such an image has already been described earlier in detail.

It will also be appreciated that the at least one server could be configured to skip an operation of applying the respective EDOF corrections to at least one image in a sequence of N consecutive images, when it is determined that an EDOF-corrected version of the at least one image can be replaced by at least one of: an optical-focus-adjusted image, a fusion of at least two other images available in a recently-received batch. Said fusion could be employed beneficially, for example, when objects in a given scene of the real-world environment are at optical depths such that the fusion of the at least two other images would have the objects in focus.

In the recently-received batch, these consecutive images are made available to be displayed to the given eye of the given user in advance. In other words, these consecutive images are available to be displayed at future time instants. Such consecutive images could, for example, be stored in a framebuffer associated with the given client device. In this regard, the processor can easily detect in the recently-received batch of consecutive images availability of said image, and when said image is available in the recently-received batch, the processor could utilise any one of the aforementioned images for displaying purpose. Using any one of the aforementioned images for displaying at the given client device, instead of the given EDOF-corrected image, is particularly beneficial when the aforementioned images are more accurate, realistic, and up-to-date as compared to the given EDOF-corrected image. Beneficially, displaying any one of the aforementioned images to the given user may lead to a more realistic and immersive viewing experience for the given user. Moreover, prior to display of a given image at the given client device, the processor may reproject the given image, based on a head pose of the given user of the given client device, and optionally, a gaze direction of the given user. Image reprojection and its techniques are well-known in the art.

It will also be appreciated that instead of using said image, the processor may use the fusion of said image and the given EDOF-corrected image (that was originally intended for displaying at a given time instant) for display at the given client device. Such a fusion could be a full-stacked image fusion (in which a pixel of a fused image is generated by combining a corresponding pixel of said image with a corresponding pixel of the given EDOF-corrected image), or could be blending of a selected region only (for example, a gaze region in said image). Alternatively, it would be beneficial to use the fusion of said image and the at least two EDOF-corrected images available in the recently-received batch for display at the given client device at the given time instant, when said image corresponds to a later time instant in a sequence of the consecutive images in the recently-received batch. For example, the aforesaid fusion is used when said sequence would be: EDOF, EDOF, AF (as shown for a third user in conjunction with FIGS. 2B and 2C). Image fusion is well-known in the art.

Optionally, when it is detected that said image is not available in the recently-received batch of consecutive images, the processor of the given client device is configured to use any one of:
  the given EDOF-corrected image,
  another EDOF-corrected image available in the recently-received batch,
  a fusion of the given EDOF-corrected image and the another EDOF-corrected image,
  a fusion of at least two EDOF-corrected images available in the recently-received batch,
for display at the given client device.

In this regard, the processor could utilise any one of the aforementioned images for displaying purpose, when said image is unavailable in the recently-received batch and the at least two EDOF-corrected images are available in the recently-received batch. Using any one of the at least two EDOF-corrected images, instead of the given EDOF-corrected image, is beneficial when any one of the at least two EDOF-corrected images is more accurate and realistic as compared to the given EDOF-corrected image. Using any one of the aforementioned fusion of images for display at the given client device could be beneficial when the aforementioned fusion of images is considerably more accurate, realistic, and up-to-date as compared to the given EDOF-corrected image, and therefore could be preferred over the given EDOF-corrected image. The aforementioned fusion of images could be a full-stacked image fusion, or could be blending of a selected region only (for example, a gaze region).

It will be appreciated that when said image (namely, the optical-focus-adjusted image) is available in the recently-received batch of consecutive images, but a pose with which the given camera has captured said image is considerably different from a pose of the given camera corresponding to the given EDOF-corrected image, said image may not be used by the at least one server for display at the given client device, or even for fusion of images.

Moreover, optionally, the at least one server is configured to:
- receive, from the client devices of the N users, information indicative of respective gaze directions of the N users;
- send, to the imaging device, the information indicative of the respective gaze directions of the N users; and
- receive, from the imaging device in each cycle of N consecutive pairs of left images and right images, only one image as an entire frame and cropped gaze regions of remaining images in said cycle, wherein a gaze region of a given image is determined based on a gaze direction of a given user for which the given image is to be selected.

Based on the gaze directions of the N users, only the gaze regions (namely, regions of interest) in the remaining images in said cycle are taken into account for generating the N consecutive pairs of left images and right images. Thus, only one image as the entire frame and the cropped gaze regions of the remaining images are sent to the at least one server, instead of sending all images as entire frames (covering an entire field of view). As an example, for four consecutive pairs of left images and right images, only one left image and one right image are sent as entire frames, while only cropped gaze regions of remaining three left images and remaining three right images are sent. In other words, the imaging device sends an $L^{th}$ image as an entire frame, but every $L+1^{th}$, $L+2^{th}$, and $L+3^{th}$ images are cropped to cover only their respective gaze regions.

It will be appreciated that such a manner of generating the N consecutive pairs of left images and right images facilitates in achieving a higher frame rate. In an example, the frame rate of the given camera may be increased by four times, for example, such as from 25 frames per second (FPS) to 100 FPS. The technical benefit of increasing the frame rate of the given camera without increasing data bandwidth is that the same imaging device could be employed to serve a larger number of users simultaneously.

The present disclosure also relates to the method as described above. Various embodiments and variants disclosed above, with respect to the aforementioned system, apply mutatis mutandis to the method.

Optionally, the N optical depths comprise fixed optical depths. Optionally, the method further comprises selecting an optical depth based on two different optical depths at which at least two users from amongst the N users are gazing, when the two different optical depths correspond to a same focussing distance range that is covered by adjusting the optical focus of a given camera according to the selected optical depth, wherein the N optical depths comprise the selected optical depth.

Alternatively, optionally, the N optical depths comprise the optical depths at which the N users are gazing, and wherein the $M^{th}$ optical depth is an optical depth at which an $M^{th}$ user is gazing, the at least one user being the $M^{th}$ user, further wherein the another optical depth is an optical depth at which another user other than the $M^{th}$ user is gazing.

Optionally, the method further comprises:
- receiving, at a given client device of a given user from amongst the N users, consecutive images for a given eye of the given user in batches, wherein a given batch of consecutive images comprises at least two EDOF-corrected images and, optionally, an image selected for the given user or captured by adjusting the optical focus of a given camera according to an optical depth at which the given user is gazing;
- detecting, prior to displaying a given EDOF-corrected image at the given client device, whether an image selected for the given user or captured by adjusting the optical focus of the given camera according to the optical depth at which the given user is gazing is available in a recently-received batch of consecutive images; and
- when it is detected that said image is available in the recently-received batch of consecutive images, using any one of:
  - said image,
  - a fusion of said image and the given EDOF-corrected image,
  - a fusion of said image and at least two EDOF-corrected images available in the recently-received batch, for display at the given client device, instead of the given EDOF-corrected image.

Optionally, when it is detected that said image is not available in the recently-received batch of consecutive images, the method comprises using any one of:
- the given EDOF-corrected image,
- another EDOF-corrected image available in the recently-received batch,
- a fusion of the given EDOF-corrected image and the another EDOF-corrected image,
- a fusion of at least two EDOF-corrected images available in the recently-received batch, for display at the given client device.

Optionally, the method further comprises:
- receiving, from the client devices of the N users, information indicative of respective gaze directions of the N users;
- sending, to the imaging device, the information indicative of the respective gaze directions of the N users; and
- receiving, from the imaging device in each cycle of N consecutive pairs of left images and right images, only one image as an entire frame and cropped gaze regions of remaining images in said cycle, wherein a gaze region of a given image is determined based on a gaze direction of a given user for which the given image is to be selected.

DETAILED DESCRIPTION OF THE DRAWINGS

Figure 1B:
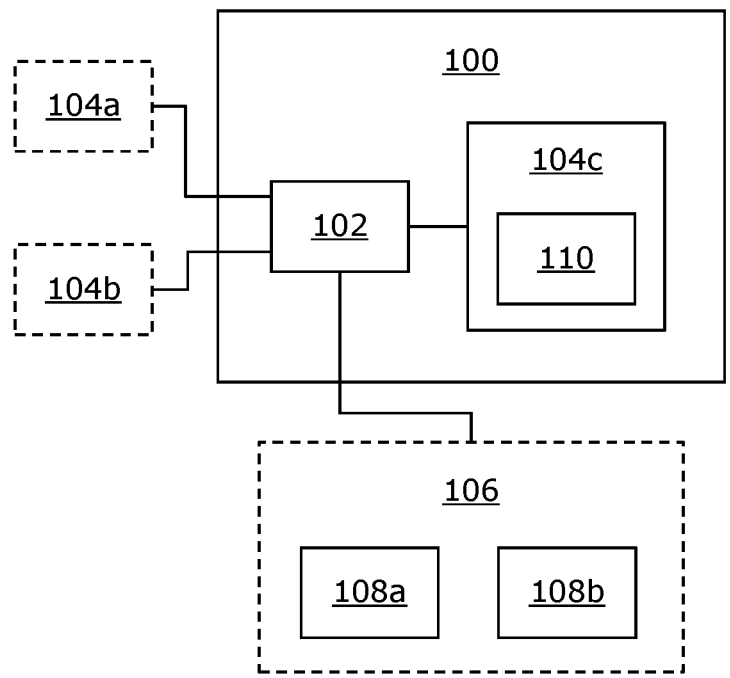

Referring to FIGS. 1A and 1B, illustrated are block diagrams of architectures of a system 100 incorporating adjustable focus and extended depth-of-field correction, in accordance with different embodiments of the present disclosure. In FIGS. 1A and 1B, the system 100 comprises at least one server (depicted as a server 102). The server 102 is communicably coupled to a plurality of client devices (depicted as client devices 104a and 104b of two users), and to an imaging device 106. The imaging device 106 comprises a left camera 108a and a right camera 108b. In FIG. 1B, the system 100 further comprises at least one client device depicted as a client device 104c of a user, wherein the client device 104c comprises a processor 110.

It may be understood by a person skilled in the art that the FIGS. 1A and 1B include simplified architectures of the system 100 for sake of clarity, which should not unduly limit the scope of the claims herein. It is to be understood that the specific implementations of the system 100 are provided as examples and are not to be construed as limiting it to specific numbers or types of servers, client devices, imaging devices, cameras, and processors. The person skilled in the art will recognize many variations, alternatives, and modifications of embodiments of the present disclosure.

Referring to FIGS. 2A, 2B, 2C, and 2D, illustrated are different exemplary ways in which consecutive pairs of left images and right images are displayed at client devices of different users, in accordance with an embodiment of the present disclosure. In the figures, "AF" refers to an optical-focus-adjusted image captured by adjusting an optical focus of a given camera, and "EDOF" refers to an extended depth-of-field (EDOF)-corrected image.

Figure 2A:
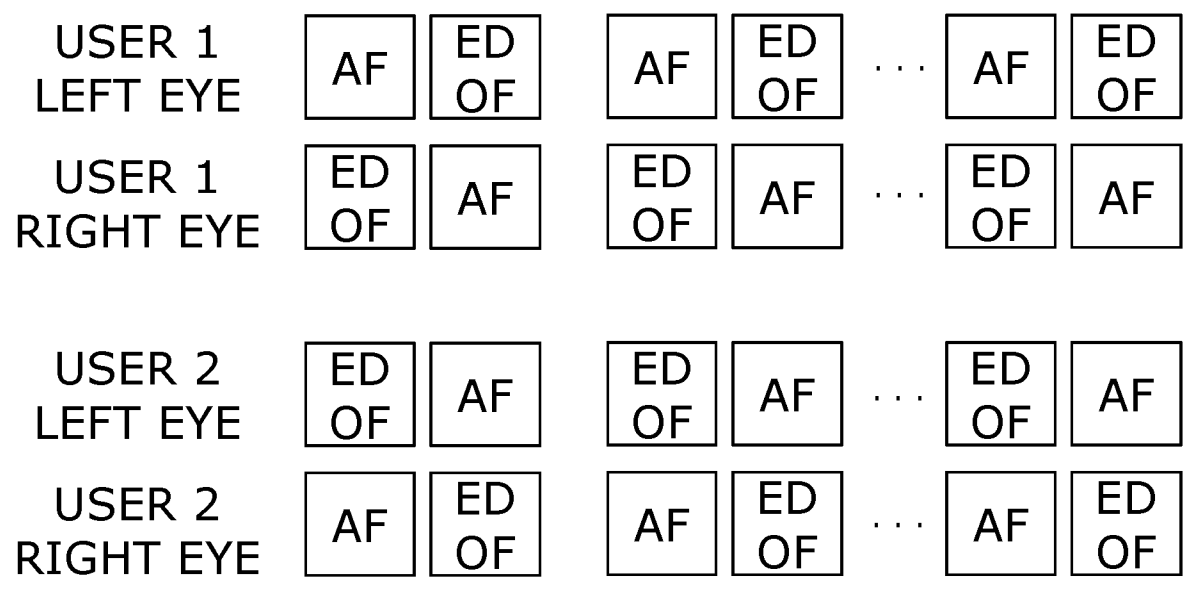

With reference to FIG. 2A, there is shown a sequence in which two consecutive pairs of left images and right images are displayed at client devices of two different users. As an example, "AF" and "EDOF" are displayed to a first user viewing a first pair of a left image and a right image, respectively. Likewise, "EDOF" and "AF" are displayed to a second user viewing said first pair.

Figure 2B:
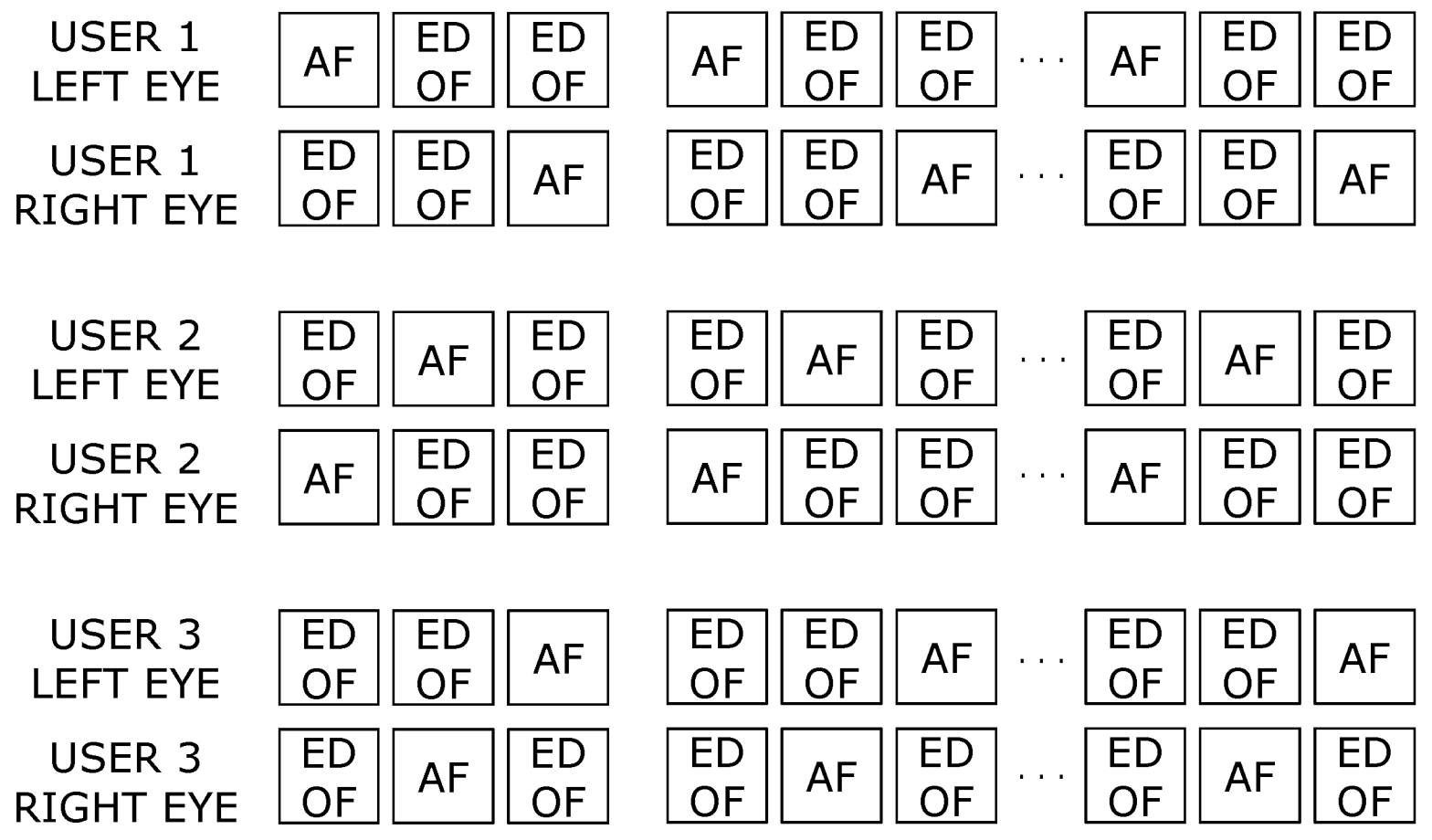

With reference to FIGS. 2B and 2C, there are shown two different sequences in which three consecutive pairs of left images and right images are displayed at client devices of three different users. As an example, with reference to FIG. 2B, "EDOF" and "EDOF" are displayed to a first user viewing a second pair of a left image and a right image, respectively. Likewise, "AF" and "EDOF" are displayed to a second user viewing said second pair, and "EDOF" and "AF" are displayed to a third user viewing said second pair. As another example, with reference to FIG. 2C, "EDOF" and "AF" are displayed to a first user viewing a second pair of a left image and a right image. Likewise, "AF" and "EDOF" are displayed to a second user viewing said second pair, and "EDOF" and "EDOF" are displayed to a third user viewing said second pair.

With reference to FIG. 2D, there is shown a sequence in which four consecutive pairs of left images and right images are displayed at client devices of four different users. As an example, "EDOF" and "EDOF" are displayed to a first user as well as to a second user viewing a fourth pair of a left image and a right image. Likewise, "EDOF" and "AF" are displayed to a third user viewing said fourth pair, and "AF" and "EDOF" are displayed to a fourth user viewing said fourth pair.

FIGS. 2A-2D are merely examples, which should not unduly limit the scope of the claims herein. The person skilled in the art will recognize many variations, alternatives, and modifications of embodiments of the present disclosure.

Figure 3:
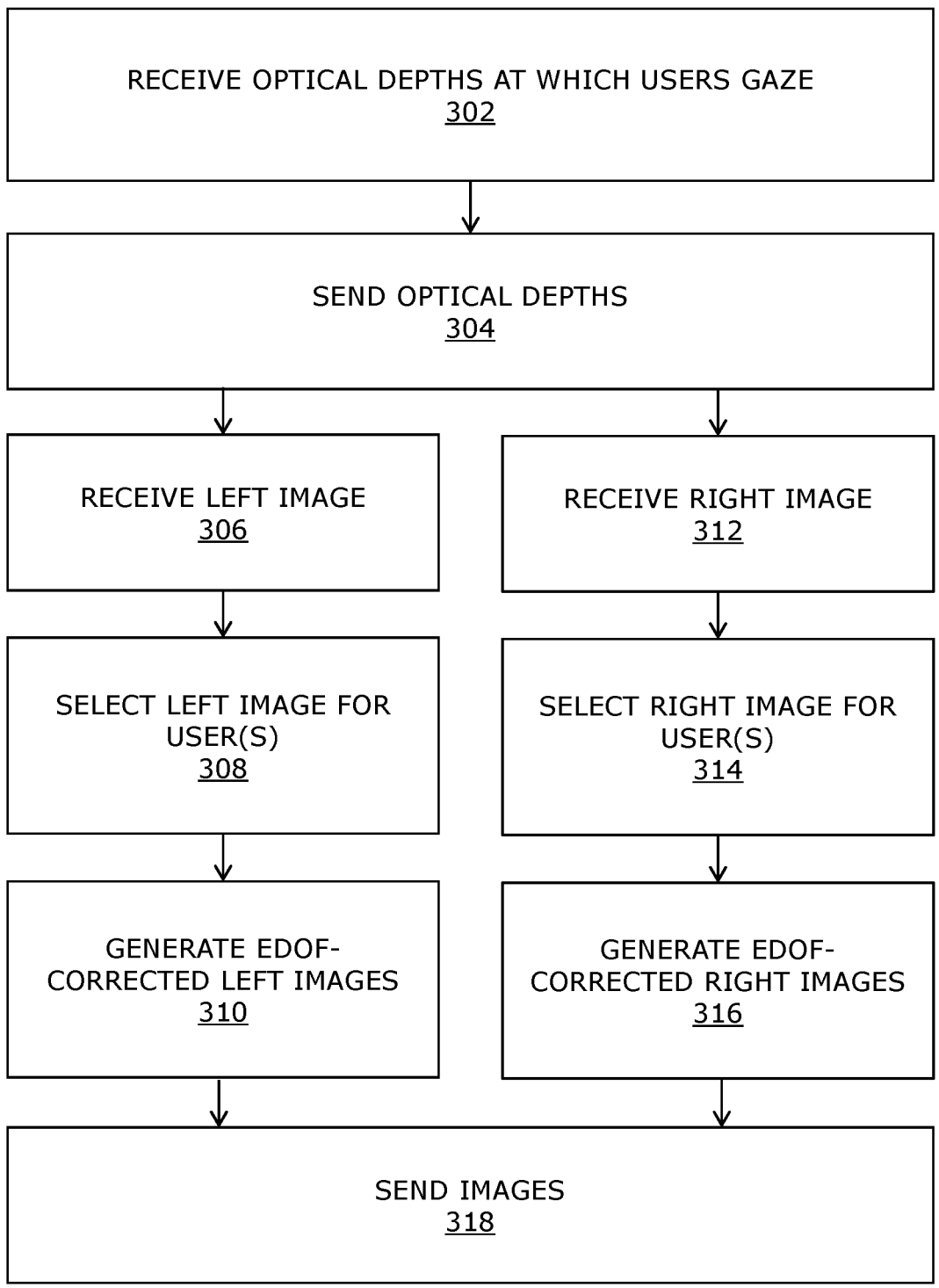
FIG. 3 illustrates steps of a method incorporating adjustable focus and extended depth-of-field correction, in accordance with an embodiment of the present disclosure.

Referring to FIG. 3, illustrated are steps of a method incorporating adjustable focus and extended depth-of-field correction, in accordance with an embodiment of the present disclosure. At step 302, information indicative of respective optical depths at which the N users are gazing is received from client devices of N users. At step 304, information indicative of N optical depths is sent to an imaging device, wherein the imaging device comprises a left camera and a right camera, each of the left camera and the right camera having an adjustable optical focus. For each cycle of N consecutive pairs of left images and right images, for M ranging from 1 to N, steps 306, 308, 310, 312, 314, 316 and 318 are performed.

At step 306, an $M^{th}$ left image captured by adjusting the optical focus of the left camera according to an $M^{th}$ optical depth from amongst the N optical depths is received from the imaging device. At step 308, the $M^{th}$ left image is selected for at least one user who is gazing at an optical depth that lies in a focusing distance range covered by adjusting the optical focus of the left camera according to the $M^{th}$ optical depth. At step 310, respective extended depth-of-field (EDOF) corrections are applied to the $M^{th}$ left image, based on respective optical depths at which one or more users other than the at least one user are gazing, for generating respective EDOF-corrected $M^{th}$ left images. At step 312, an $M^{th}$ right image captured by adjusting the optical focus of the right camera according to another optical depth from amongst the N optical depths is received from the imaging device, wherein each of N consecutive right images in said cycle corresponds to a different optical depth from amongst the N optical depths. At step 314, the $M^{th}$ right image is selected for at least one other user who is gazing at an optical depth that lies in another focusing distance range covered by adjusting the optical focus of the right camera according to the another optical depth. At step 316, respective EDOF corrections are applied to the $M^{th}$ right image, based on respective optical depths at which one or more users other than the at least one other user are gazing, for generating respective EDOF-corrected $M^{th}$ right images. At step 318, the $M^{th}$ left image is sent to a client device of the at least one user, the EDOF-corrected $M^{th}$ left images are sent to respective ones of client devices of the one or more users other than the at least one user, the $M^{th}$ right image is sent to a client device of the at least one other user, and the EDOF-corrected $M^{th}$ right images are sent to respective ones of client devices of the one or more users other than the at least one other user.

The aforementioned steps are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A system comprising at least one server communicably coupled to client devices of N users and an imaging device, wherein the imaging device comprises a left camera and a right camera, each of the left camera and the right camera having an adjustable optical focus, wherein the at least one server is configured to:
  receive, from the client devices of the N users, information indicative of respective optical depths at which the N users are gazing;
  send, to the imaging device, information indicative of N optical depths; and in each cycle of N consecutive pairs of left images and right images, for M ranging from 1 to N:
  receive, from the imaging device, an $M^{th}$ left image captured by adjusting the optical focus of the left camera according to an $M^{th}$ optical depth from amongst the N optical depths;
  select the $M^{th}$ left image for at least one user who is gazing at an optical depth that lies in a focusing distance range covered by adjusting the optical focus of the left camera according to the $M^{th}$ optical depth;
  apply respective extended depth-of-field (EDOF) corrections to the $M^{th}$ left image, based on respective optical depths at which one or more users other than the at least one user are gazing, to generate respective EDOF-corrected $M^{th}$ left images;

receive, from the imaging device, an $M^{th}$ right image captured by adjusting the optical focus of the right camera according to another optical depth from amongst the N optical depths, wherein each of N consecutive right images in said cycle corresponds to a different optical depth from amongst the N optical depths;

select the $M^{th}$ right image for at least one other user who is gazing at an optical depth that lies in another focusing distance range covered by adjusting the optical focus of the right camera according to the another optical depth;

apply respective EDOF corrections to the $M^{th}$ right image, based on respective optical depths at which one or more users other than the at least one other user are gazing, to generate respective EDOF-corrected $M^{th}$ right images; and send the $M^{th}$ left image to a client device of the at least one user, the EDOF-corrected $M^{th}$ left images to respective ones of client devices of the one or more users other than the at least one user, the $M^{th}$ right image to a client device of the at least one other user, and the EDOF-corrected $M^{th}$ right images to respective ones of client devices of the one or more users other than the at least one other user.

2. The system of claim 1, wherein the N optical depths comprise fixed optical depths.

3. The system of claim 1, wherein the at least one server is configured to select an optical depth based on two different optical depths at which at least two users from amongst the N users are gazing, when the two different optical depths correspond to a same focussing distance range that is covered by adjusting the optical focus of a given camera according to the selected optical depth, wherein the N optical depths comprise the selected optical depth.

4. The system of claim 1, wherein the N optical depths comprise the optical depths at which the N users are gazing, and wherein the $M^{th}$ optical depth is an optical depth at which an $M^{th}$ user is gazing, the at least one user being the $M^{th}$ user, further wherein the another optical depth is an optical depth at which another user other than the $M^{th}$ user is gazing.

5. The system of claim 1, wherein N is one of: 2, 3 or 4.

6. The system of claim 1, further comprising a given client device of a given user from amongst the N users, wherein a processor of the given client device is configured to:

receive consecutive images for a given eye of the given user in batches, wherein a given batch of consecutive images comprises at least two EDOF-corrected images and, optionally, an image selected for the given user or captured by adjusting the optical focus of a given camera according to an optical depth at which the given user is gazing;

detect, prior to displaying a given EDOF-corrected image, whether an image selected for the given user or captured by adjusting the optical focus of the given camera according to the optical depth at which the given user is gazing is available in a recently-received batch of consecutive images; and when it is detected that said image is available in the recently-received batch of consecutive images, use any one of:
said image,
a fusion of said image and the given EDOF-corrected image,
a fusion of said image and at least two EDOF-corrected images available in the recently-received batch, for display at the given client device, instead of the given EDOF-corrected image.

7. The system of claim 6, wherein, when it is detected that said image is not available in the recently-received batch of consecutive images, the processor of the given client device is configured to use any one of:
the given EDOF-corrected image,
another EDOF-corrected image available in the recently-received batch,
a fusion of the given EDOF-corrected image and the another EDOF-corrected image,
a fusion of at least two EDOF-corrected images available in the recently-received batch,
for display at the given client device.

8. The system of claim 1, wherein the at least one server is configured to:

receive, from the client devices of the N users, information indicative of respective gaze directions of the N users;

send, to the imaging device, the information indicative of the respective gaze directions of the N users; and receive, from the imaging device in each cycle of N consecutive pairs of left images and right images, only one image as an entire frame and cropped gaze regions of remaining images in said cycle, wherein a gaze region of a given image is determined based on a gaze direction of a given user for which the given image is to be selected.

9. A method comprising:

receiving, from client devices of N users, information indicative of respective optical depths at which the N users are gazing;

sending, to an imaging device, information indicative of N optical depths, wherein the imaging device comprises a left camera and a right camera, each of the left camera and the right camera having an adjustable optical focus; and in each cycle of N consecutive pairs of left images and right images, for M ranging from 1 to N:

receiving, from the imaging device, an $M^{th}$ left image captured by adjusting the optical focus of the left camera according to an $M^{th}$ optical depth from amongst the N optical depths;

selecting the $M^{th}$ left image for at least one user who is gazing at an optical depth that lies in a focusing distance range covered by adjusting the optical focus of the left camera according to the $M^{th}$ optical depth;

applying respective extended depth-of-field (EDOF) corrections to the $M^{th}$ left image, based on respective optical depths at which one or more users other than the at least one user are gazing, for generating respective EDOF-corrected $M^{th}$ left images;

receiving, from the imaging device, an $M^{th}$ right image captured by adjusting the optical focus of the right camera according to another optical depth from amongst the N optical depths, wherein each of N consecutive right images in said cycle corresponds to a different optical depth from amongst the N optical depths;

selecting the $M^{th}$ right image for at least one other user who is gazing at an optical depth that lies in another focusing distance range covered by adjusting the optical focus of the right camera according to the another optical depth;

applying respective EDOF corrections to the $M^{th}$ right image, based on respective optical depths at which one or more users other than the at least one other user are gazing, for generating respective EDOF-corrected $M^{th}$ right images; and sending the $M^{th}$ left image to a client device of the at least one user, the EDOF-corrected $M^{th}$ left images to respective ones of client devices of the one or more users other than the at least one user, the $M^{th}$ right image to a client device of the at least one other user, and the EDOF-corrected $M^{th}$ right images to respective ones of client devices of the one or more users other than the at least one other user.

10. The method of claim 9, wherein the N optical depths comprise fixed optical depths.

11. The method of claim 9, further comprising selecting an optical depth based on two different optical depths at which at least two users from amongst the N users are gazing, when the two different optical depths correspond to a same focussing distance range that is covered by adjusting the optical focus of a given camera according to the selected optical depth, wherein the N optical depths comprise the selected optical depth.

12. The method of claim 9, wherein the N optical depths comprise the optical depths at which the N users are gazing, and wherein the $M^{th}$ optical depth is an optical depth at which an $M^{th}$ user is gazing, the at least one user being the $M^{th}$ user, further wherein the another optical depth is an optical depth at which another user other than the $M^{th}$ user is gazing.

13. The method of claim 9, wherein N is one of: 2, 3 or 4.

14. The method of claim 9, further comprising:
receiving, at a given client device of a given user from amongst the N users, consecutive images for a given eye of the given user in batches, wherein a given batch of consecutive images comprises at least two EDOF-corrected images and, optionally, an image selected for the given user or captured by adjusting the optical focus of a given camera according to an optical depth at which the given user is gazing;
detecting, prior to displaying a given EDOF-corrected image at the given client device, whether an image selected for the given user or captured by adjusting the optical focus of the given camera according to the optical depth at which the given user is gazing is available in a recently-received batch of consecutive images; and
when it is detected that said image is available in the recently-received batch of consecutive images, using any one of:
said image,
a fusion of said image and the given EDOF-corrected image,
a fusion of said image and at least two EDOF-corrected images available in the recently-received batch,
for display at the given client device, instead of the given EDOF-corrected image.

15. The method of claim 14, wherein, when it is detected that said image is not available in the recently-received batch of consecutive images, the method comprises using any one of:
the given EDOF-corrected image,
another EDOF-corrected image available in the recently-received batch,
a fusion of the given EDOF-corrected image and the another EDOF-corrected image,
a fusion of at least two EDOF-corrected images available in the recently-received batch,
for display at the given client device.

16. The method of claim 9, further comprising:
receiving, from the client devices of the N users, information indicative of respective gaze directions of the N users;
sending, to the imaging device, the information indicative of the respective gaze directions of the N users; and
receiving, from the imaging device in each cycle of N consecutive pairs of left images and right images, only one image as an entire frame and cropped gaze regions of remaining images in said cycle, wherein a gaze region of a given image is determined based on a gaze direction of a given user for which the given image is to be selected.

* * * * *